Oct. 20, 1931.  W. L. SPALDING  1,827,828
TREATMENT OF INDOXYL
Filed May 16, 1927
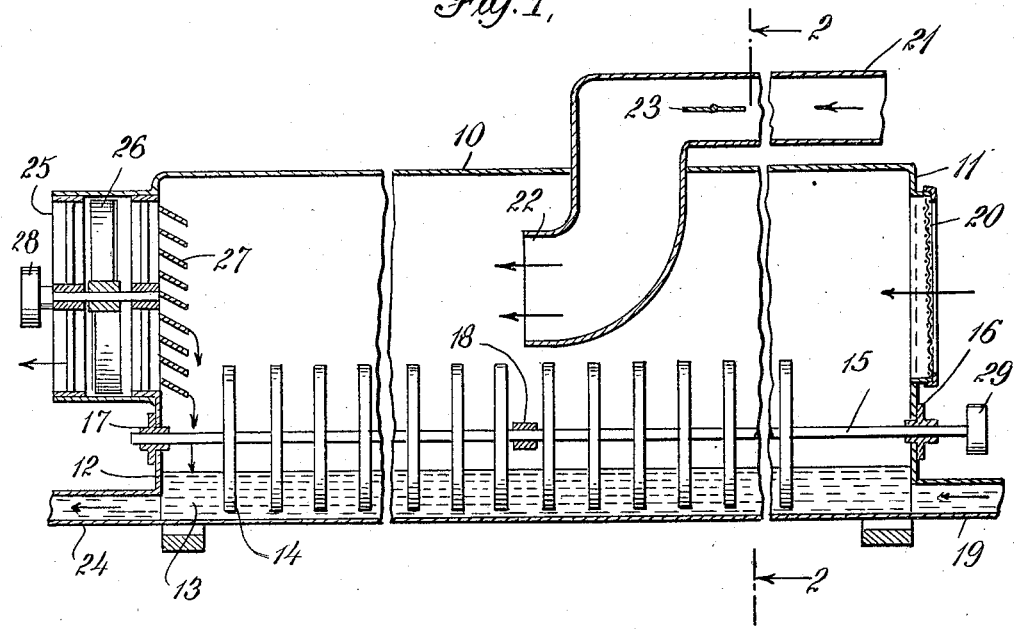
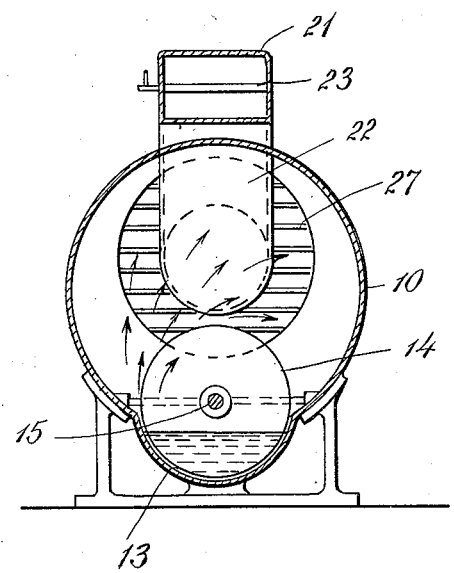
INVENTOR
WILLIAM L. SPALDING
BY
*William J. Karelitz*
ATTORNEY Patented Oct. 20, 1931

1,827,828

UNITED STATES PATENT OFFICE

WILLIAM L. SPALDING, OF BUFFALO, NEW YORK, ASSIGNOR TO NATIONAL ANILINE & CHEMICAL COMPANY, INC., OF NEW YORK, N. Y., A CORPORATION OF NEW YORK

TREATMENT OF INDOXYL

Application filed May 16, 1927. Serial No. 191,702.

This invention relates to the oxidation of indoxyl in the production of indigo and also to the conversion of a portion of the caustic alkali, e. g., sodium hydroxide, accompanying the indoxyl, to a carbonate in a continuous manner to permit a subsequent continuous filtration with ordinary commercial apparatus, and give a more uniform product.

The customary method of indoxyl oxidation for the production of indigo consists in blowing with air a batch of alkaline liquid containing it until the oxidation is regarded as complete. It requires large volumes of compressed air together with the apparatus necessary for supplying the air. The resultant solution, which contains the indigo in suspension, is then filtered and the filtered solution is carbonated with flue gas in a packed tower. The solution is circulated through the tower by means of pumps.

In general, the purpose of carbonation is to convert the caustic soda which is present, or a portion of it, into sodium carbonate which is subsequently recovered by concentrating the solution by evaporation.

According to the present invention, the caustic solution containing indoxyl is oxidized and carbonated in a unitary operation and in one piece of apparatus. Preferably, the indoxyl flows as a continuous stream from which particles are lifted, with a minimum of disturbance to the stream, and projected or mechanically atomized into a current of an oxidizing and carbonating atmosphere moving at a rate adjusted to give adequate oxidation and carbonation. The oxidation may be accomplished by air introduced into one zone through which the fluid flows and the carbonation may be accomplished in another zone to which flue gas is supplied. The resultant solution, which contains the indigo in suspension, is preferably subjected to filtration on a continuous rotary filter. The process of this invention, therefore, provides a continuous operation with a continuous supply of product for filtering and a dispersion of the liquid into the air in contrast to the intermittent batch methods and blowing of the batch as hitherto commonly practiced. By it, foaming difficulties are minimized and maintenance expense is decreased due to the avoidance of the use of compressed air and pumping operations. Floor space is saved, and operation and control are simplified.

A suitable apparatus for carrying out the process outlined above is illustrated in the accompanying drawings in which Fig. 1 is a longitudinal vertical section of the apparatus showing an embodiment of my invention; and Fig. 2 is a transverse section on line 2—2 of Fig. 1.

A horizontal cylindrical tunnel or elongated chamber 10 with ends 11 and 12 has a trough 13 formed in the bottom. The trough is preferably of cylindrical shape to conform to the peripheries of vertical discs 14 mounted on a horizontal shaft 15 extending the length of the tunnel and suitably supported, as by end bearings 16 and 17 and intermediate bearing 18. The end 11 has an inlet 19 for liquor, and an inlet 20 for air, the latter being suitably screened or otherwise protected. Intermediate the ends there is provided an inlet 22 for flue gas conducted to said inlet by a flue 21 having a controlling damper valve 23. The other end 12 of the tunnel has a liquor outlet 24 forming a continuation of the trough, and a gas outlet 25. In the outlet 25 there is mounted a suction fan 26, driven at a suitable speed to cause air and gas currents to flow at a rate that gives adequate oxidation and carbonation. Baffling means 27 may be attached to the gas outlet to separate entrained liquor or solids from the gases. The liquor outlet 24 leads to a storage tank or directly to a filter. Suitable operating means, conventionally indicated by pulleys 28 and 29, serve to drive the fan and the shaft 15 to which the discs 14 are attached.

In use, liquor containing indoxyl is supplied to and withdrawn from the trough preferably at a rate to maintain a suitable level, such as indicated in Fig. 2. The rotating discs pick up the liquor and, as their peripheries emerge from the liquor, particles or finely divided portions are hurled or thrown off, i. e., the liquid is mechanically atomized, as indicated by arrows in Fig. 2, into the oxidizing atmosphere maintained in the tunnel by the suction of the fan. Sufficient force is preferably imparted to the particles by the rotating discs so that they traverse the gaseous space and collect on the wall of the tunnel. The collected particles flow downward over the walls and drain back into the trough. In the portion toward the discharge end of the tunnel the particles traverse the flue gases supplied by the inlet 21 and sodium hydroxide in the liquor is carbonated.

It will be understood that in place of air any suitable oxygen containing gas may be used, for example, oxygen alone or in admixture with an inert gas, and that in place of flue gas any suitable gas containing carbon dioxide may be employed, for example carbon dioxide alone or in admixture with an inert gas.

Numerous modifications can be made without departing from the spirit or scope of the invention. For example, flue gases may be admitted with the air at the inlet end of the tunnel thus simultaneously oxidizing and carbonating the liquor, or the liquor may be first carbonated and then oxidized. Again, other means for spraying the liquor may be substituted for the discs such as the common forms of spray nozzles or atomizers. Another evident modification is the insertion or addition of a separating chamber at the gas outlet to remove moisture, and a precipitator connected therewith for separating solids remaining in the gases.

I claim:

1. In the treatment of indoxyl contained in a liquid, the improvement which comprises spraying the liquid into an atmosphere containing oxygen.

2. In the treatment of indoxyl contained in a liquid medium containing caustic alkali, the improvement which comprises spraying the liquid medium into an atmosphere containing oxygen.

3. In the treatment of indoxyl contained in a liquid, the improvement which comprises spraying the liquid into an atmosphere containing oxygen and a carbonating agent.

4. In the treatment of indoxyl contained in a liquid medium containing caustic alkali, the improvement which comprises continuously spraying the liquid medium in a zone supplied with air, and removing treated liquid from said zone.

5. In the treatment of indoxyl contained in a liquid medium containing caustic alkali, the improvement which comprises spraying the liquid medium into a combined oxygen-containing and carbonating atmosphere.

6. In the treatment of indoxyl contained in a liquid containing caustic alkali, the improvement which comprises spraying the liquid medium into an atmosphere of air.

7. In the treatment of indoxyl contained in a liquid, the improvement which comprises spraying the liquid into an atmosphere containing air.

8. In the treatment of indoxyl contained in a liquid medium containing caustic alkali, the improvement which comprises spraying said liquid medium into an atmosphere containing an oxygen-containing gas and a gaseous carbonating agent.

9. In the treatment of indoxyl contained in a liquid medium containing caustic alkali, the improvement which comprises spraying said liquid into a mixture of air and flue gas.

In testimony whereof I affix my signature.

WILLIAM L. SPALDING.